(12) United States Patent
Cleveland

(10) Patent No.: US 8,570,719 B2
(45) Date of Patent: Oct. 29, 2013

(54) FIRE RESISTANT ENCLOSURE FOR A DATA STORAGE DEVICE HAVING HEAT SINK CAPABILITIES AND METHOD FOR MAKING THE SAME

(75) Inventor: Terri P. Cleveland, Holley, NY (US)

(73) Assignee: John D. Brush & Co., Inc., Rochester, NY (US)

(*) Notice: Subject to any disclaimer, the term of this patent is extended or adjusted under 35 U.S.C. 154(b) by 59 days.

(21) Appl. No.: 12/673,662

(22) PCT Filed: Aug. 21, 2008

(86) PCT No.: PCT/US2008/073847
§ 371 (c)(1),
(2), (4) Date: Feb. 16, 2010

(87) PCT Pub. No.: WO2009/026431
PCT Pub. Date: Feb. 26, 2009

(65) Prior Publication Data
US 2011/0019355 A1    Jan. 27, 2011

Related U.S. Application Data

(60) Provisional application No. 60/957,053, filed on Aug. 21, 2007.

(51) Int. Cl.
G06F 1/16 (2006.01)
H05K 5/00 (2006.01)
H05K 7/00 (2006.01)
B65D 1/40 (2006.01)

(52) U.S. Cl.
USPC .............. 361/679.02; 361/679.33; 220/62.11

(58) Field of Classification Search
USPC ....................... 361/679.31–679.45
See application file for complete search history.

(56) References Cited

U.S. PATENT DOCUMENTS 4,513,352 A * 4/1985 Bennett et al. ............ 361/700
4,685,402 A * 8/1987 Nelson et al. ............ 109/65
(Continued)

FOREIGN PATENT DOCUMENTS

EP    0149525    7/1985
EP    0187499    7/1986
(Continued)

OTHER PUBLICATIONS

Moje, Andreas, "Written Opinion of the International Searching Authority," for International Application No. PCT/US08/073847, International Filing Date Aug. 21, 2008, mailed Nov. 24, 2008, European Patent Office, Munich, Germany.

(Continued)

*Primary Examiner* — Adrian S Wilson
(74) *Attorney, Agent, or Firm* — Woods Oviatt Gilman LLP

(57) ABSTRACT

A fire resistant enclosure for a data storage device is provided. The enclosure includes an enclosure base comprising a base cap and a base body. The base body includes a bottom wall having a side wall extending upwardly therefrom defining a base cavity. The data storage device is positioned within the cavity. A fire resistant insulation material is positioned within the base cavity to encapsulate the data storage device. The base cap is coupled with the base body to enclose the data storage device within the enclosure base. The insulation material may be in intimate contact with the data storage device, or in contact with a moisture barrier surrounding the data storage device, wherein the insulation material acts as a heat sink for said data storage device to draw heat away from the data storage device to maintain a temperature of the data storage device within an acceptable operating range.

2 Claims, 14 Drawing Sheets

(56) References Cited

U.S. PATENT DOCUMENTS

| | | | | |
|---|---|---|---|---|
| 5,069,358 A * | 12/1991 | Avery, Jr. | .................. | 220/560.01 |
| 5,096,427 A | 3/1992 | Sadigh-Behzadi | | |
| 5,438,162 A * | 8/1995 | Thompson et al. | ........... | 174/524 |
| 5,454,157 A * | 10/1995 | Ananth et al. | .............. | 29/603.03 |
| 5,583,742 A * | 12/1996 | Noda et al. | ............... | 361/679.21 |
| 5,586,002 A * | 12/1996 | Notarianni | ............... | 361/679.26 |
| 5,623,597 A * | 4/1997 | Kikinis | ............................ | 726/18 |
| 5,708,565 A * | 1/1998 | Fairbanks | ...................... | 361/704 |
| 5,750,925 A | 5/1998 | Purdom | | |
| 5,756,934 A | 5/1998 | Purdom | | |
| 5,810,919 A | 9/1998 | Olzak et al. | | |
| 6,002,584 A * | 12/1999 | Messmer et al. | ............... | 361/690 |
| 6,154,360 A * | 11/2000 | Kaczeus et al. | ........... | 361/679.34 |
| 6,158,833 A | 12/2000 | Engler | | |
| 6,289,678 B1 * | 9/2001 | Pandolfi | ............................ | 62/3.2 |
| 6,299,950 B1 | 10/2001 | Byington et al. | | |
| 6,320,744 B1 * | 11/2001 | Sullivan et al. | ........... | 361/679.34 |
| 6,430,000 B1 * | 8/2002 | Rent | ............................ | 360/97.03 |
| 6,434,000 B1 * | 8/2002 | Pandolfi | ............................ | 361/679.33 |
| 6,659,274 B2 * | 12/2003 | Enners | ............................ | 206/305 |
| 6,967,813 B2 * | 11/2005 | Hanada et al. | .............. | 360/97.01 |
| 6,967,833 B2 * | 11/2005 | Boykin et al. | ............ | 361/679.33 |
| 7,113,398 B2 * | 9/2006 | Oba et al. | .................. | 361/679.37 |
| 7,211,742 B2 | 5/2007 | Moore et al. | | |
| 7,291,784 B2 * | 11/2007 | Moore et al. | ..................... | 174/50 |
| 7,329,152 B2 * | 2/2008 | Mori et al. | ..................... | 439/638 |
| 7,399,719 B2 * | 7/2008 | Hanan et al. | ................... | 442/136 |
| 7,414,838 B2 * | 8/2008 | Yeh | ................................ | 361/688 |
| 7,436,660 B2 * | 10/2008 | Pedoeem et al. | ............ | 361/690 |
| 7,545,639 B2 | 6/2009 | Ridge | | |
| 7,703,291 B2 * | 4/2010 | Bushnik et al. | ................... | 62/3.2 |
| 7,719,828 B2 * | 5/2010 | Brown et al. | ............ | 361/679.34 |
| 7,916,487 B2 * | 3/2011 | Bitton et al. | ................... | 361/724 |
| 2002/0036149 A1 * | 3/2002 | Kwong | ..................... | 206/308.3 |
| 2004/0064631 A1 * | 4/2004 | Kishon et al. | .................. | 711/100 |
| 2004/0070926 A1 * | 4/2004 | Boykin et al. | ................. | 361/683 |
| 2004/0236988 A1 | 11/2004 | Sastrel | | |
| 2005/0057849 A1 * | 3/2005 | Twogood et al. | ........... | 360/97.02 |
| 2005/0068666 A1 * | 3/2005 | Albrecht et al. | ............ | 360/97.02 |
| 2005/0184463 A1 * | 8/2005 | Boutaghou et al. | ............ | 277/316 |
| 2005/0185366 A1 * | 8/2005 | Hanan et al. | ................... | 361/679 |
| 2006/0143817 A1 | 7/2006 | Shebek et al. | | |
| 2007/0017685 A1 | 1/2007 | Moore et al. | | |
| 2007/0139873 A1 * | 6/2007 | Thomas et al. | ................ | 361/681 |
| 2008/0175983 A1 | 7/2008 | Moore | | |
| 2009/0050365 A1 | 2/2009 | Moore et al. | | |
| 2009/0179536 A1 | 7/2009 | Moore | | |
| 2009/0219679 A1 | 9/2009 | Moore et al. | | |

FOREIGN PATENT DOCUMENTS

| | | |
|---|---|---|
| EP | 1475803 | 11/2004 |
| GB | 2168402 | 6/1986 |

OTHER PUBLICATIONS

Moje, Andreas, "International Search Report," for International Application No. PCT/US08/073847, International Filing Date Aug. 21, 2008, mailed Nov. 24, 2008, European Patent Office, Munich, Germany.

CRYOVAC Sealed Air Corporation, "FS 500 Series Films," Duncan, SC 29334.

Wildman, Kelvin H., "Bucket-Style Fire Resistant Enclosure and Method for Making the Same," U.S. Appl. No. 12/673,673, filed Feb. 16, 2010.

* cited by examiner

FIRE RESISTANT ENCLOSURE FOR A DATA STORAGE DEVICE HAVING HEAT SINK CAPABILITIES AND METHOD FOR MAKING THE SAME

CROSS REFERENCE TO RELATED APPLICATIONS

This application is a National Stage filing under 35 U.S.C. §371 of International Application No. PCT/US2008/073847, filed Aug. 21, 2008, which in turn claims the benefit of U.S. Provisional Patent Application No. 60/957,053, filed on Aug. 21, 2007, which is incorporated herein by reference in its entirety.

TECHNICAL FIELD

The present invention relates to a fire resistant enclosure for a data storage device. More particularly, the present invention relates to a fire resistant enclosure that encapsulates and places a substantial portion of a data storage device in intimate contact with a fire resistant insulation material thereby providing heat sink and impact protection capabilities to the electronic device.

BACKGROUND OF THE INVENTION

Enclosures for temporarily protecting their contents from damage from external heat sources such as fire are well known. Such enclosures are commonly referred to as being "fire-resistant" and are typically rated for protection capabilities including the time over which the stored items may be protected by the enclosure during exposure to fire. These types of enclosures may also be rated for mechanical integrity after a fall from a specified height or from objects falling onto the enclosure.

Fire resistant enclosures have long been used to store and protect valuable items, such as documents, from damage due to fire and other environmental hazards. More recently, fire resistant enclosures have been used to store and protect electronic devices, such as a data storage device, from damage due to fire. It was previously understood in the prior art that a fire resistant enclosure must provide for a certain amount of air space contained within the enclosure so that the enclosure could pass a fire test and obtain an appropriate fire test rating. However, the use of fire resistant enclosures to store and protect a data storage device creates an additional design consideration in that these devices typically generate heat inside the enclosure that needs to be dissipated in order for the data storage device to operate properly. In order to address the elevated temperatures that occur within the enclosure, prior art fire resistant enclosures have included passive and active heat transfer systems.

Fire resistant enclosures including a passive heat transfer system typically operate to store data storage devices and rely on ambient air within the internal cavity of the enclosure to absorb the heat generated by the data storage. Considering that air is typically known to be a thermal insulator rather than a thermal absorption media, providing nothing more within the internal cavity of the enclosure may limit the heat sinking capabilities of the enclosure and may disadvantageously limit the size of the data storage device able to be stored within the enclosure. Moreover, the additional air space that surrounds the data storage device adds to the size and weight of the enclosure. Further, considering that air is not typically known to be a cushioning material, providing nothing more within the internal cavity of the enclosure may disadvantageously limit the impact protection capabilities of the fire resistant enclosure.

Fire resistant enclosures including an active heat transfer system operate to expel heat from within the enclosure by using venting or passages defined in the insulation materials and the outer casing of the enclosure. Active enclosures may also utilize equipment such as fans, sensors, and controllers to maintain the temperature in the enclosure within an operating range of the data storage device. However, the need for this additional equipment in active enclosures increases manufacturing costs, as well as the size and weight of the enclosure. In addition, the use of additional components in conjunction with the enclosure create additional challenges in making the enclosure water resistant.

Therefore, what is needed is a fire resistant enclosure for a data storage device that dissipates the appropriate amount of heat to allow the data storage device to operate properly, while reducing its size, manufacturing costs, and complexity compared to prior art fire resistant enclosures for data storage devices. The present invention addresses these needs as well as other needs.

SUMMARY OF THE INVENTION

A fire resistant enclosure for an electronic device, such as a data storage device, is provided. One aspect of the present invention includes an enclosure base having a base cap and a base body. The base body includes a bottom wall having a side wall extending upwardly therefrom defining a base cavity. The data storage device is positioned within the base cavity. A fire resistant insulation material, such as hydrated Portland cement, is positioned within the base cavity to encapsulate the data storage device. The base cap is coupled with the base body to enclose the data storage device within the enclosure base, wherein the fire resistant insulation material acts as a heat sink for the data storage device to maintain the temperature of the data storage device within an acceptable operating range.

This aspect may further include a data transfer port that is mounted in the enclosure base, wherein the data transfer port is connected to the data storage device by a device cable. A status indicator may be mounted in an indicator clearance hole defined in the base body, and an indicator may be connected to the data transfer port by an indicator cable. Further, the data storage device may be supported within the cavity by a device support structure including a device length spacer and a device width spacer extending upwardly from the bottom wall and inwardly from the side wall. Moreover, data storage device may be encased in a plastic moisture barrier, such as a bag or dipped in a sealant, to protect the data storage device from being damaged by the insulation material. Further, the moisture barrier may be in intimate contact with a substantial portion of the data storage device.

A method for forming the fire resistant enclosure set forth above is also provided. The method may comprise: providing a base body including a bottom wall with a side wall extending upwardly therefrom defining a cavity; inserting the data storage device within the cavity; positioning fire resistant insulation material, such as hydrated Portland cement, within the cavity to encapsulate the data storage device; providing an enclosure cap; and coupling the enclosure cap with the base body to enclose the data storage device within the fire resistant enclosure, wherein fire resistant insulation material acts as a heat sink for data storage device. The fire resistant insulation material may be placed in intimate contact with either a substantial portion of the data storage device or a moisture barrier encasing, such as a plastic bag or seal coating. The data storage device may be encapsulated with about one inch of the insulation material all the way around the data storage device. In addition, a data transfer port may be provided that extends through a port clearance hole defined in the side wall of the base body, and that connects the data storage device to the data transfer port using a device cable. The device cable may be encapsulated within the fire resistant insulation material.

In another aspect of the present invention, a fire resistant enclosure comprising an enclosure base and an enclosure lid is provided. The enclosure base comprises a base cap and a base body. The base body includes a bottom wall having a side wall extending upwardly therefrom defining a base cavity, and the base body defines a first portion of a storage compartment. Fire resistant insulation material is positioned within the base cavity, and the base cap is coupled with the base body to enclose the fire resistant insulation material within the enclosure base. Upon capping, the base is overturned so that the storage compartment is positioned to receive the data storage device. A data storage device is positioned within the storage compartment, wherein the entire data storage device is in close proximity to the internal surface or walls of the storage compartment of the base body so that the insulation material within the base body acts as a heat sink for the data storage device through the walls of the compartment. A second portion of the storage compartment defined by the enclosure lid and the first portion of the storage compartment defined by the enclosure base are then coupled with one another to define the storage compartment. Further, the enclosure lid comprises a lid cap and a lid body. The lid body includes a bottom wall having a side wall extending upwardly therefrom defining a lid body cavity. Fire resistant insulation material is positioned within the lid body cavity, wherein the lid cap is coupled with the lid body to enclose the fire resistant insulation material within the enclosure lid.

A method for forming the fire resistant enclosure provided in the second aspect is also provided. The method comprises: providing an enclosure base comprising a base cap and a base body. The base body includes a bottom wall with a side wall extending upwardly therefrom defining a base cavity; positioning fire resistant insulation material within the base cavity to encapsulate the data storage device; coupling the base cap with the base body to enclose the fire resistant insulation material in the base cavity; providing an enclosure lid comprising a lid cap and a lid body. The lid body including a bottom wall with a side wall extending upwardly therefrom defining a lid cavity; positioning fire resistant insulation material within the lid cavity; coupling the lid cap with the lid body to enclose the fire resistant insulation material in the lid cavity; allowing a data storage device to be placed within a storage compartment defined by the base body; and allowing the enclosure base to be coupled with the enclosure lid to enclose the data storage device within the storage compartment. The entire data storage device is in close proximity to the storage compartment of the base body so that the insulation material within the base body acts as a heat sink for the data storage device through the walls of the storage compartment.

The method in accordance with the second aspect may further include: providing a data transfer port extending through a port clearance hole defined in the enclosure base, and connecting the data storage device to the data transfer port using a device cable. Further, the device and/or a status cable may be routed through the fire resistant enclosure between the base and lid using wiring features defined in an outer surface of the base. Further, the data storage device may be surrounded on all sides with one inch of the insulation material positioned around the compartment in the base and in the body of the lid.

BRIEF DESCRIPTION OF THE DRAWINGS

The above-mentioned and other features and advantages of this invention, and the manner of attaining them, will become apparent and be better understood by reference to the following description of the aspects of the invention in conjunction with the accompanying drawings, wherein.

DETAILED DESCRIPTION OF THE INVENTION

Figure 1:
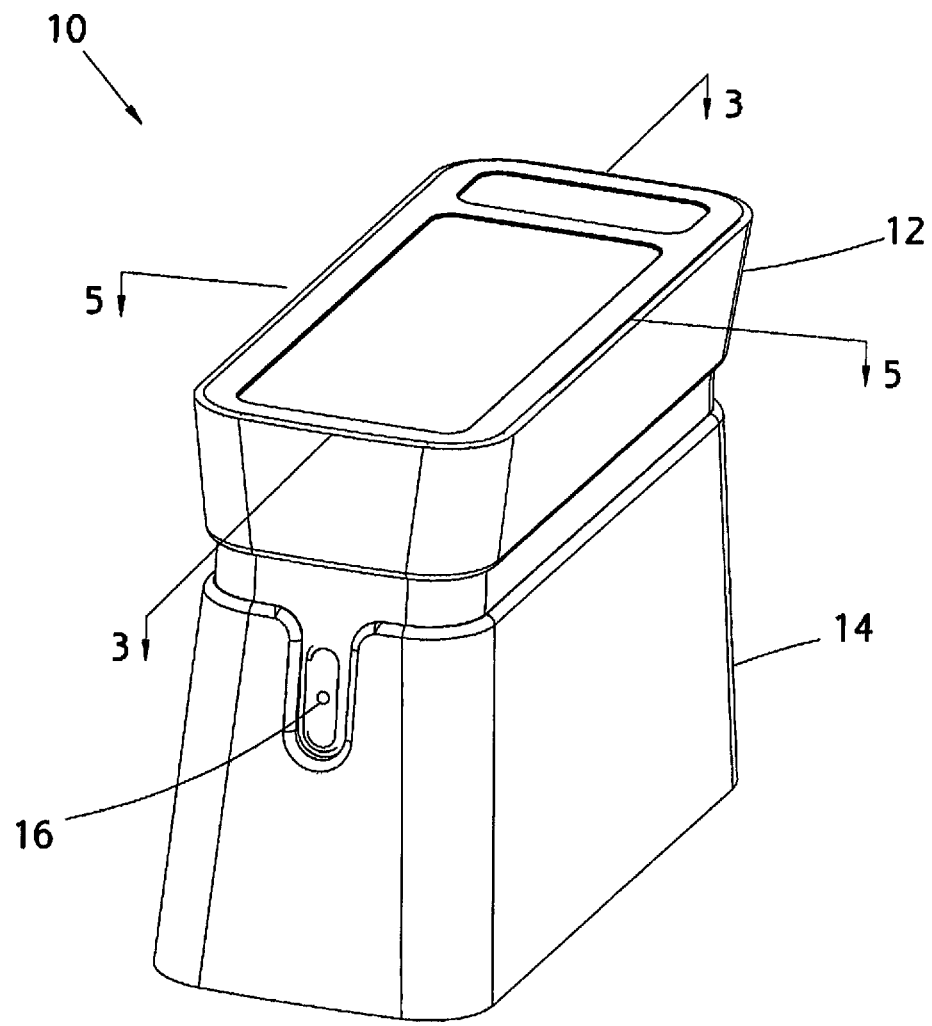
FIG. 1 is a front perspective view of a fire resistant enclosure in accordance a first aspect of the present invention.
Figure 2:
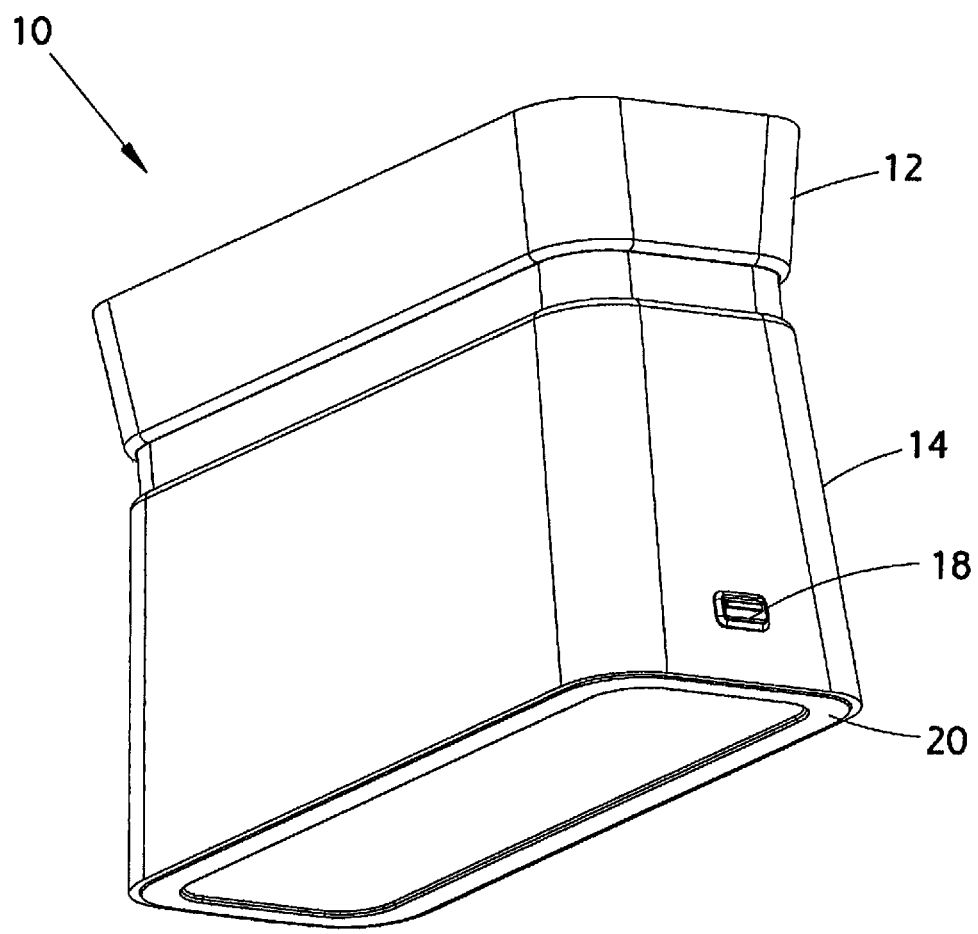
FIG. 2 is a rear perspective view of the fire resistant enclosure shown in FIG. 1.
Figure 3:
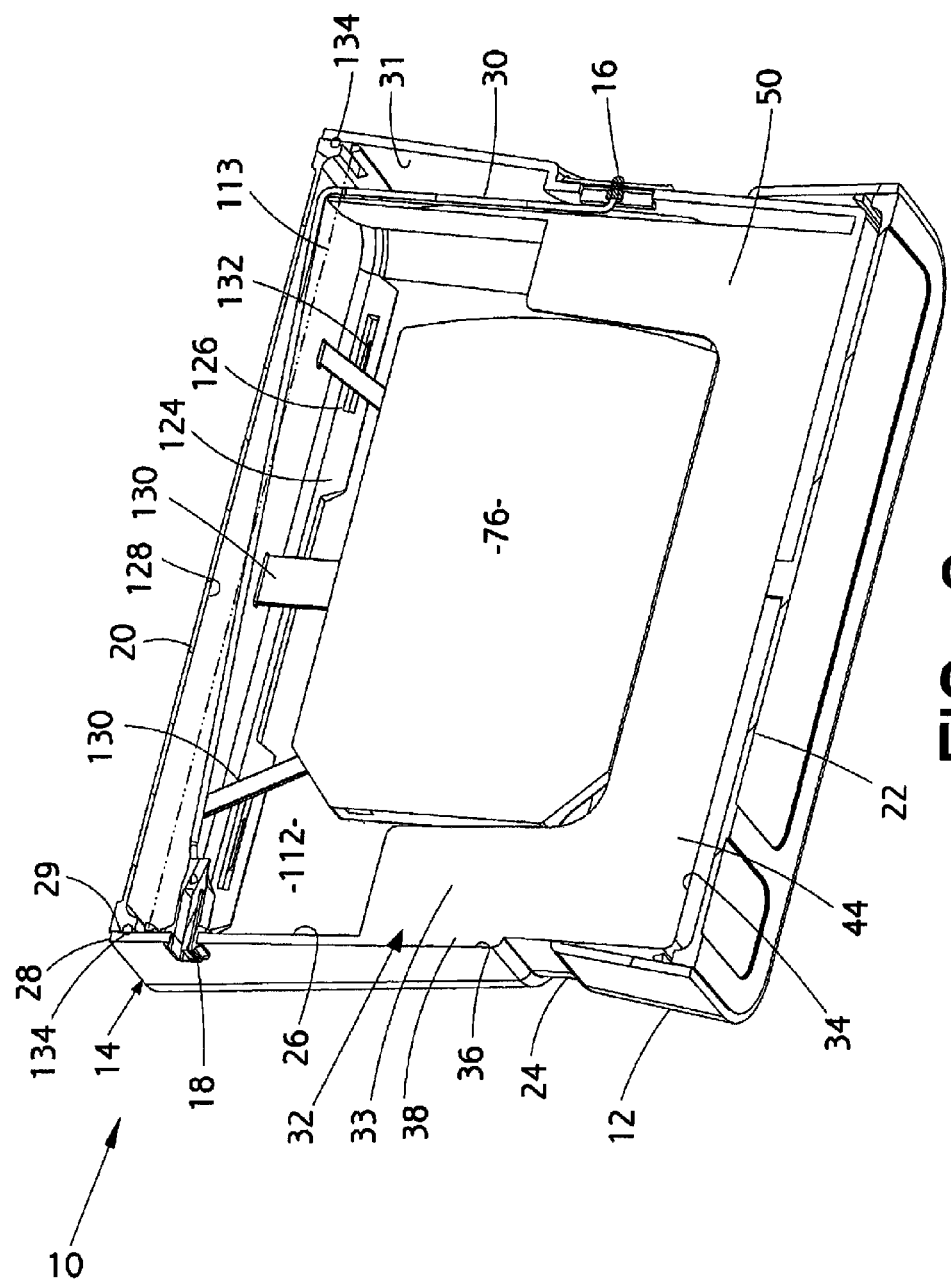
FIG. 3 is an inverted perspective view of a cross section taken along line 3-3 of the fire resistant enclosure shown in FIG. 1.

Referring to the drawings in detail, and particularly FIGS. 1-3, a first aspect of a bucket-style fire resistant enclosure is shown generally as reference numeral 10. Bucket-style fire resistant enclosure 10 generally includes a base body 14 for housing an electronic device, such as a data storage device 76, within a thermal insulation fire-resistant material 112 to protect data storage device 76 from fire, water, and other environmental hazards. In general, data storage device is encapsulated within insulation material 112 so that the insulation material 112 acts as a heat sink to allow the heat generated by data storage device 76 to be adsorbed by insulation material 112 to maintain the operating temperature of data storage device 76 within an acceptable operating range. It will be understood that data storage device 76 may be in direct contact with insulation material 112, or placed in a plastic bag or dipped in a sealant to protect data storage device 76 from being damaged by insulation material 112. Fire resistant enclosure 10 may also include an enclosure cover 12 that attaches to base body 14, a status indicator 16 to provide the operational status of data storage device 76, a data transfer port 18 for connecting data storage device 76 to an external computing system, and a base cap 20 for capping the base body 14. It will be understood that data transfer port 18, for example, a USB port, may allow power, data, and/or communication signals to pass therethrough.

Figure 4:
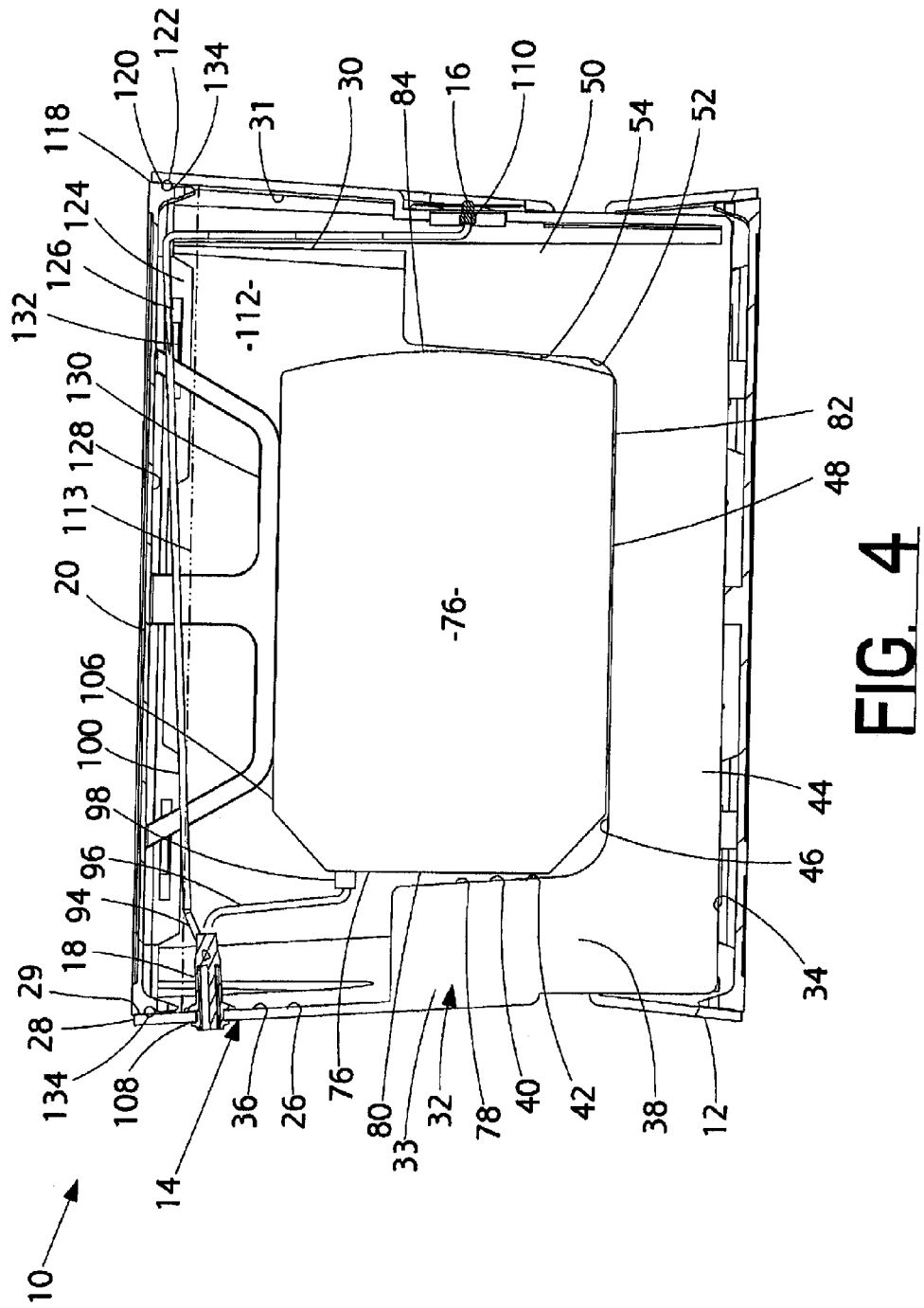
FIG. 4 is an inverted cross sectional view taken along line 3-3 of the fire resistant enclosure shown in FIG. 1.
Figure 5:
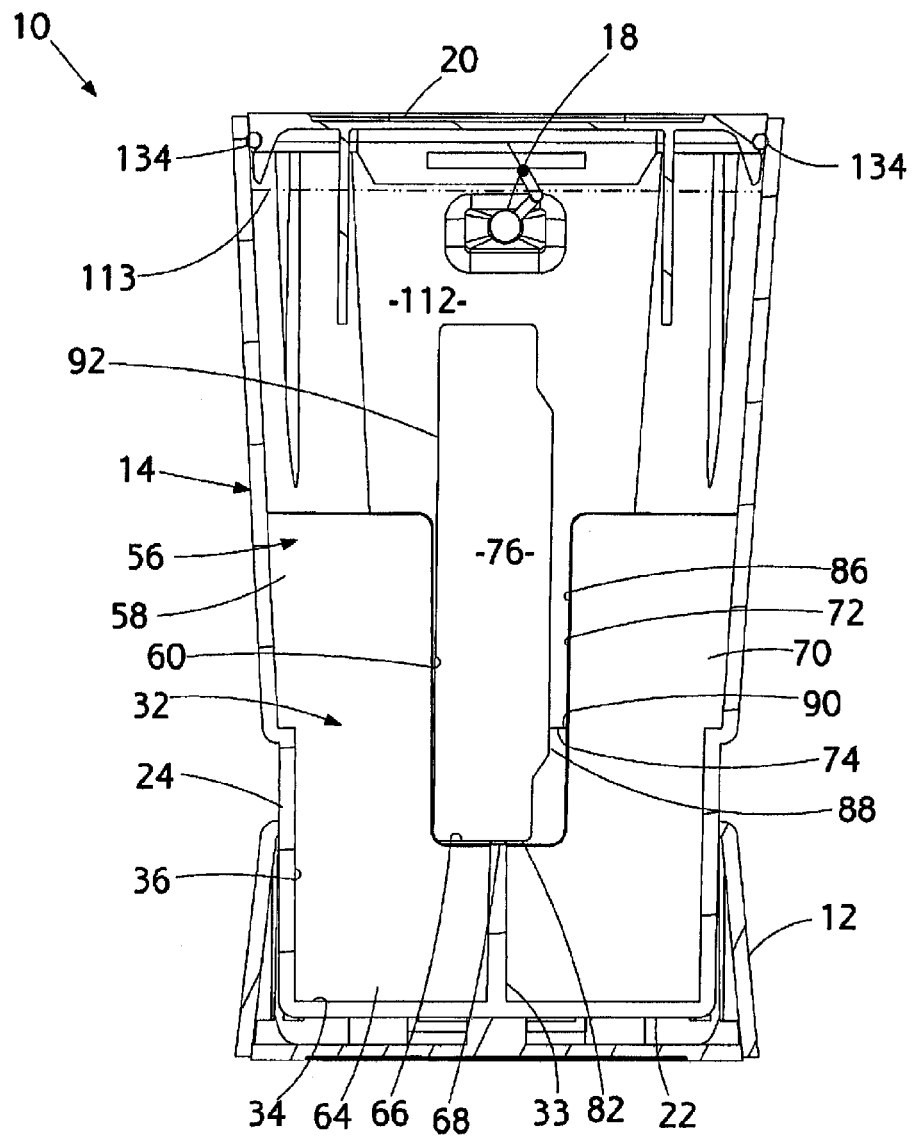
FIG. 5 is a cross sectional view taken along line 5-5 of the fire resistant enclosure shown in FIG. 1.

Referring now to FIGS. 3-5, base body 14 of enclosure 10 is shown in an upside down orientation because base body 14 is a bucket-style body that is filled and capped before overturning it to the orientation as shown in FIGS. 1 and 2. Base body 14 may be formed by an injection molding process using a polymeric resin, for example, high density polyethylene (HDPE), that has a melting point higher than the boiling point of water. Base body 14 includes a seamless bottom wall 22 and a seamless side wall 24 extending upwardly therefrom defining a base body cavity 26. Side wall 24 includes an upper peripheral edge 28 that defines an opening 29 in base body cavity 26 to allow fire resistant insulation material 112 to be poured within base body cavity 26. With particular reference to FIGS. 3 and 4, bottom wall 22 may further comprise an upwardly extending partition 30 that operates in conjunction with side wall 24 to define a status indicator cavity 31 within base body 14. It will be understood that status indicator cavity 31 does not necessarily need to be filled with insulation material 112.

With reference to FIGS. 3-5, base body 14 may further comprise a support structure 32 for positioning data storage device 76 within enclosure 10. Support structure 32 includes a device length spacer 33 extending upwardly from an internal bottom surface 34 and inwardly from an internal side surface 36 of base body 14. Device length spacer 33 comprises a first end portion 38 having an inner edge 40 that includes a plurality of spacing tabs 42, a middle portion 44 having an upper edge 46 including a plurality of spacing tabs 48, and a second end portion 50 having an inner edge 52 including a plurality of spacing tabs 54. Further, as best seen in FIG. 5, base body 14 may comprise a device width spacer 56 extending upwardly from internal bottom surface 34 and inwardly from internal side surface 36 of base body 14. Device width spacer 56 comprises a first end portion 58 having an inner edge 60, a middle portion 64 having an upper edge 66 including a plurality of spacing tabs 68, and a second end portion 70 having an inner edge 72 including a plurality of spacing tabs 74.

Device length spacer 33 and device width spacer 56 may be configured to support an electronic device 76, such as, but not limited to, a 2.5" hard disc drive (FIGS. 3-5 and 11), 3.5" hard disc drive (FIG. 14) or other type of data storage device, within base body cavity 26 of fire resistant enclosure 10. In the instance that electronic device 76 is a hard disc drive, it is understood that some off-the-shelf hard disc drive assemblies may include the hard disc drive enclosed in an outer protective shell, wherein an air gap is present between the outer protective shell and the hard disc drive. It should be understood that the fire-resistant insulation that is described as being in intimate contact with the hard disc drive is preferably in intimate contact with the hard disc drive itself, and not necessarily the outer protective shell, wherein air gaps between the fire-resistant insulation and the hard disc drive are minimized or eliminated.

In operation, spacing tabs 42, 48, 54 of device length spacer 33 may operate to create a plurality of device length filling gaps 78 between inner edges 40, 46, 52 and a first edge 80, a bottom edge 82, and a second edge 84 of data storage device 76, respectively. Similarly, spacing tabs 68, 74 of device width spacer 56 may operate to create a plurality of device width filling gaps 86 between inner edges 66, 72 and bottom edge 82, and a second side surface 88 of data storage device 76. Further, plurality of spacing tabs 74 of second end portion 70 of device width spacer 56 may have a length 90 operable to bias a first side surface 92 of data storage 76 against inner edge 60 of first portion 58 of device width spacer 56.

As best seen in FIG. 4, an electrical cable assembly 94 may comprise data transfer port 18, an electronic device cable 96, and an electronic device connector 98. Electronic device connector 98 may be plugged into data storage device 76 so that electronic device cable 96 may conduct power, data, and/or communication signals between electronic device 76 and data transfer port 18, for example, a USB connection port. Electrical cable assembly 94 may further comprise status indicator 16, such as an LED, and a status indicator cable 100 that is routed through base cavity 26 and over partition 30 and operates to conduct signals indicating conditions such as, but not limited to, power status of data storage device 76 to status indicator 16.

Electronic device connector 98 and/or data storage device 76 may be encased in a moisture barrier 106, for example, a plastic bag or dipped in a curable sealant, to prevent insulation material 112 from penetrating any openings formed in data storage device 76. One type of bag that may be used is formed of a multi-layer (e.g., 2 layers) coextruded film that is about 5 millimeters thick, such as a FS 5050 film manufactured by Cryovac Sealed Air Corporation, Duncan, S.C.

Data storage device 76 is installed into base body cavity 26 and is supported by device length spacer 33 and device width spacer 56. Data transfer port 18 may be installed in a port clearance hole 108 defined in side wall 24, and status indicator 16 may be installed in an indicator clearance hole 110 in a portion of side wall 24 that defines status indicator cavity 31. Data storage device 76, the interior portion of data transfer port 18, and/or cables 96,100 may be encapsulated within bucket-style fire resistant enclosure 10 by pouring or otherwise positioning thermal insulation fire-resistant material 112 within base body cavity 26, wherein the thermally insulation fire-resistant material 112 may be a hydrated Portland cement having between about 40-60% water content and including nylon fibers. In particular, insulation material 112 is filled to a level 113 below upper peripheral edge 28 that defines opening 29 of base body cavity 26. For example, insulation material 112 may be filled approximately ¼" below upper peripheral edge 28. Further, insulation material 112 may be in intimate contact with the entire or a substantial portion of data storage device 76, or with the bag that the data storage device 76 is placed within or the sealant that the data storage device 76 was dipped in, if these alternatives are used. About one inch of insulation material 112 may surround the entire, or a substantial portion, of data storage device 76. It will be understood that the fire resistant insulation material 112 that encapsulates data storage device 76 not only provides protection from fire and water, but also serves as a heat sink to allow heat generated by data storage device 76 to be adsorbed into insulation material 112 and dissipated from enclosure 10. The amount of heat adsorbed by insulation material 112 is sufficient to allow data storage device 76 to operate within an acceptable operational temperature range such as, for example, between about 90-100° F. for a 2.5" hard disc drive and below about 140° F. for a 3.5" hard disc drive.

It should also be understood that data storage device 76 may have wireless capability to transfer data without the use of data transfer port 18. Thus, this aspect may be configured to eliminate portion of the data transfer port 18 that allows for the transfer of data and the portion of cable 96 that provides for the transfer of data. Unless data storage device operates on battery power, it should be understood that there still may need to be a port and power cable to provide power to data storage device 76.

Base cap 20 is coupled with base body 14 to enclose data storage device 76 in base body 14. Base cap 20 may be formed of a polymeric resin, for example, high density polyethylene (HDPE), that has a melting point higher than the boiling point of water. As best seen in FIGS. 3 and 4, base cap 20 may include an outer peripheral edge 118 comprising a groove 120 operable to secure a gasket 122 therein, and a plurality of downwardly extending flanges 124 having slots 126 defined therein. Gasket 122 may be formed from an elastomer such as, for example, an elastomeric polymerization product of ethylene propylene diene monomer (EPDM) or neoprene. Further, base cap 20 may include a bottom surface 128 having a plurality of posts 130 extending downwardly therefrom for anchoring base cap 20 in insulation material 112.

Base cap 20 is coupled with base body 14 by positioning outer peripheral edge 118 and gasket 122 within internal side surface 36 of side wall 24. Base cap 20 is lowered into base body 14 until slots 126 of flanges 124 interlock with a plurality of base cap anchors 132 extending inwardly from internal side surface 36 of sidewall 24. In this position, posts 130 embed within insulation materials 112 further securing base cap 20 within base body 14 when insulation material 112 cures. It should be understood that an interface 134 is created between base cap 20 and base body 14 that is not in contact with insulation material 112 since insulation material 112 is filled to a level 113 below interface 134. Base body 14 containing encapsulated electronic device 76 and cables 96, 100 may then be overturned and an enclosure cover 12 installed over bottom wall 22 and side wall 24 of bucket-style fire resistant enclosure 10.

Encapsulation of data storage device 76 within insulation material 112 provides fire resistant enclosure 10 with advantages not present in fire resistant enclosures previously used to store data storage devices. For example, heat sinking properties of insulation material 112 in intimate contact with data storage device 76 operates to adsorb and dissipate heat generated by data storage device 76 thereby maintaining the operating temperature of the data storage device 76 running within enclosure 10 within an acceptable operating range. Further, encapsulating data storage device 76 within insulation material 112 may provide increased impact protection to data storage device 76 should fire resistant enclosure 10 fall or be struck by a falling object, both of which may occur during a structural fire. The encapsulation of data storage device 76 within insulation material 112 also protects data storage device 76 from water damage. The elimination of the space between the data storage device 76 and the insulation material also allows for the enclosure to be reduced in size.

Figure 6:
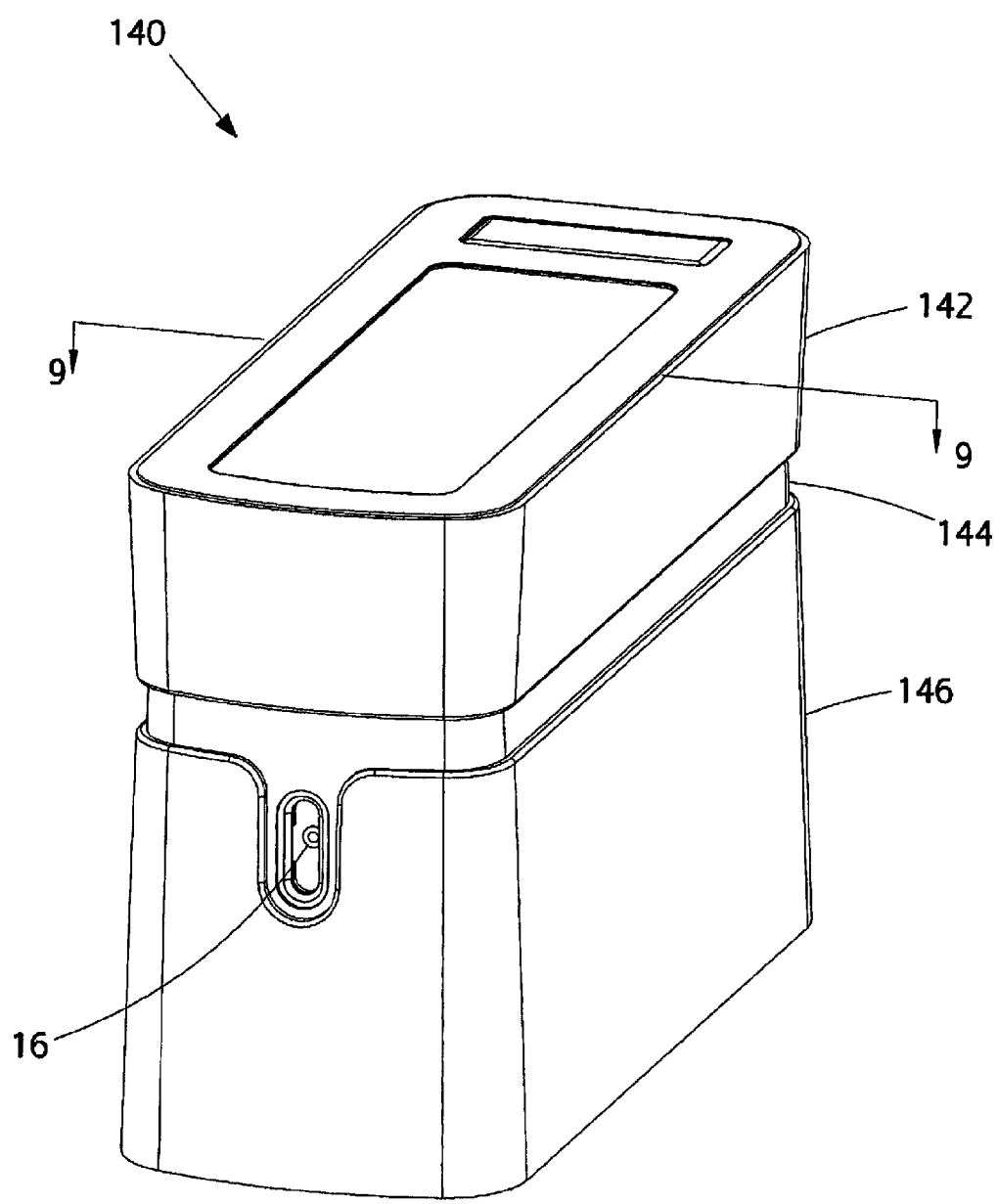
FIG. 6 is a front perspective view of a fire resistant enclosure in accordance a second aspect of the present invention.
Figure 7:
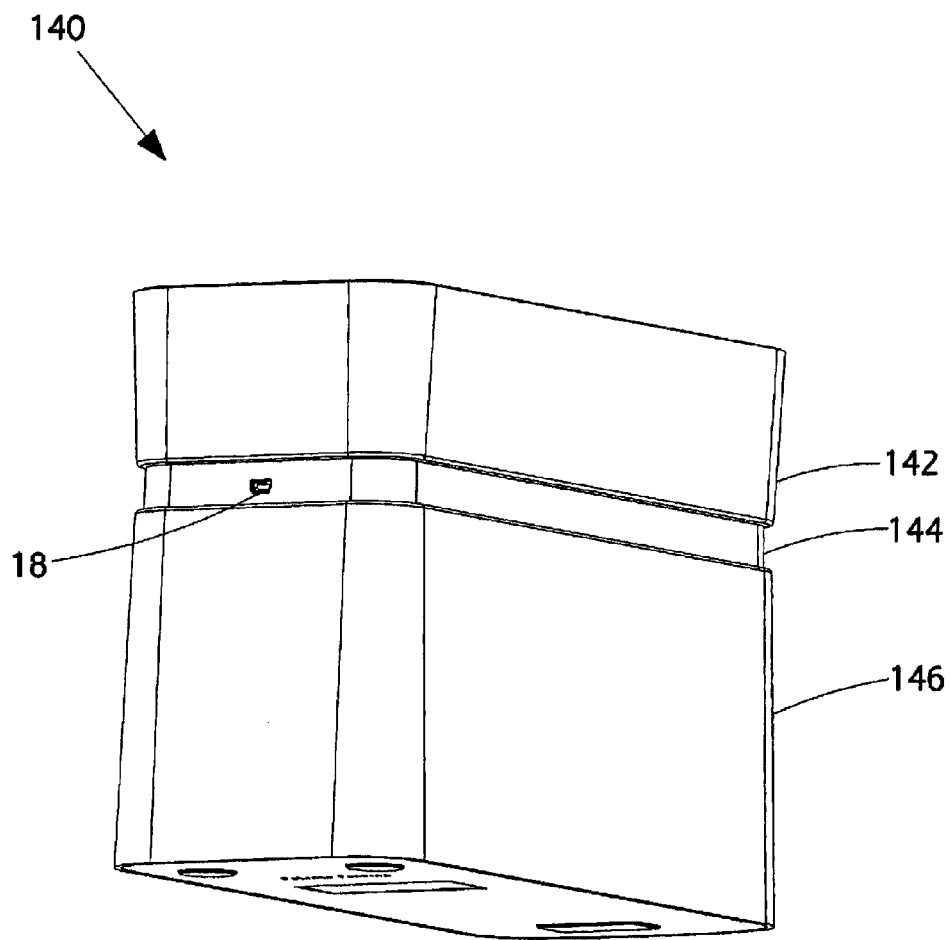
FIG. 7 is a rear perspective view of the fire resistant enclosure shown in FIG. 6.
Figure 8:
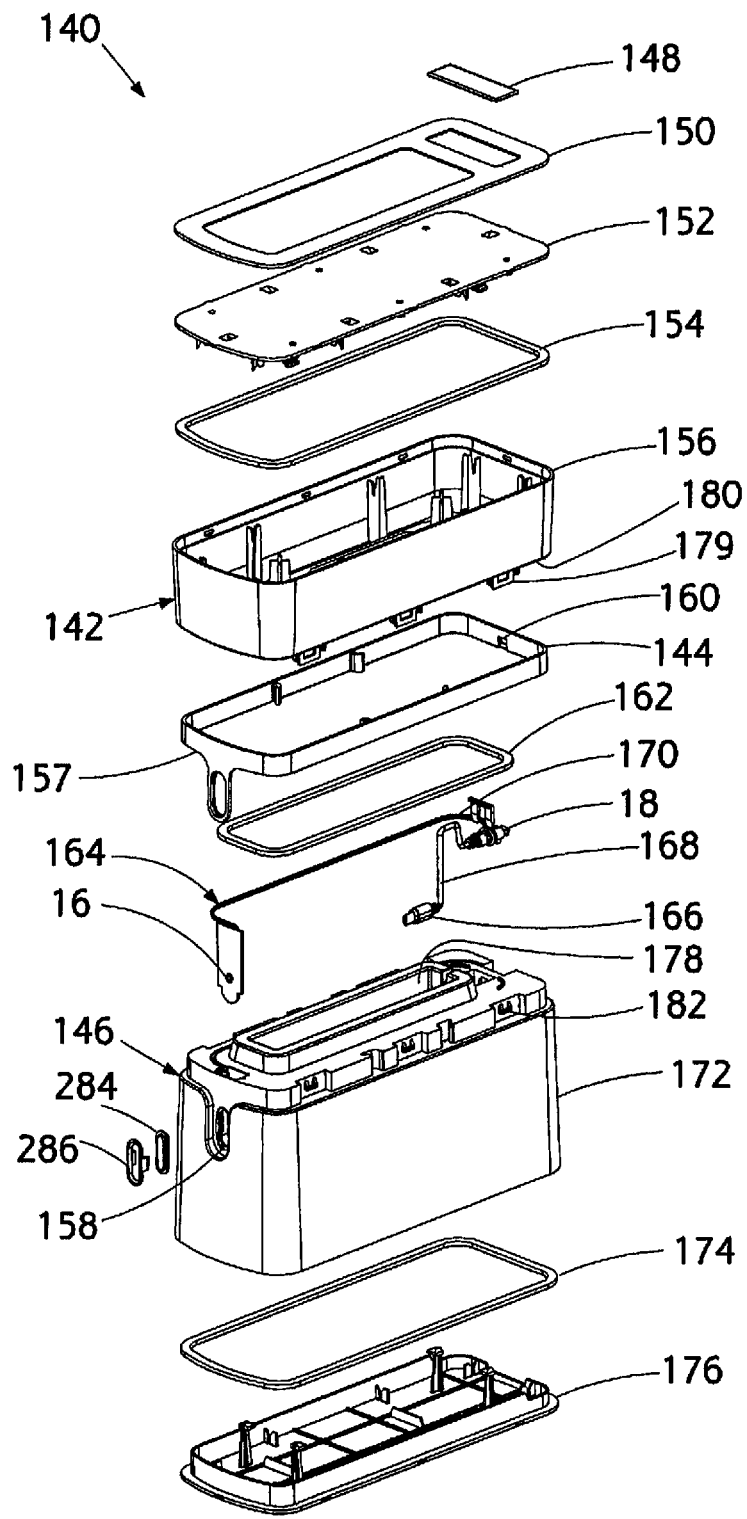
FIG. 8 is an exploded perspective view of the fire resistant enclosure shown in FIG. 6.
Figure 9:
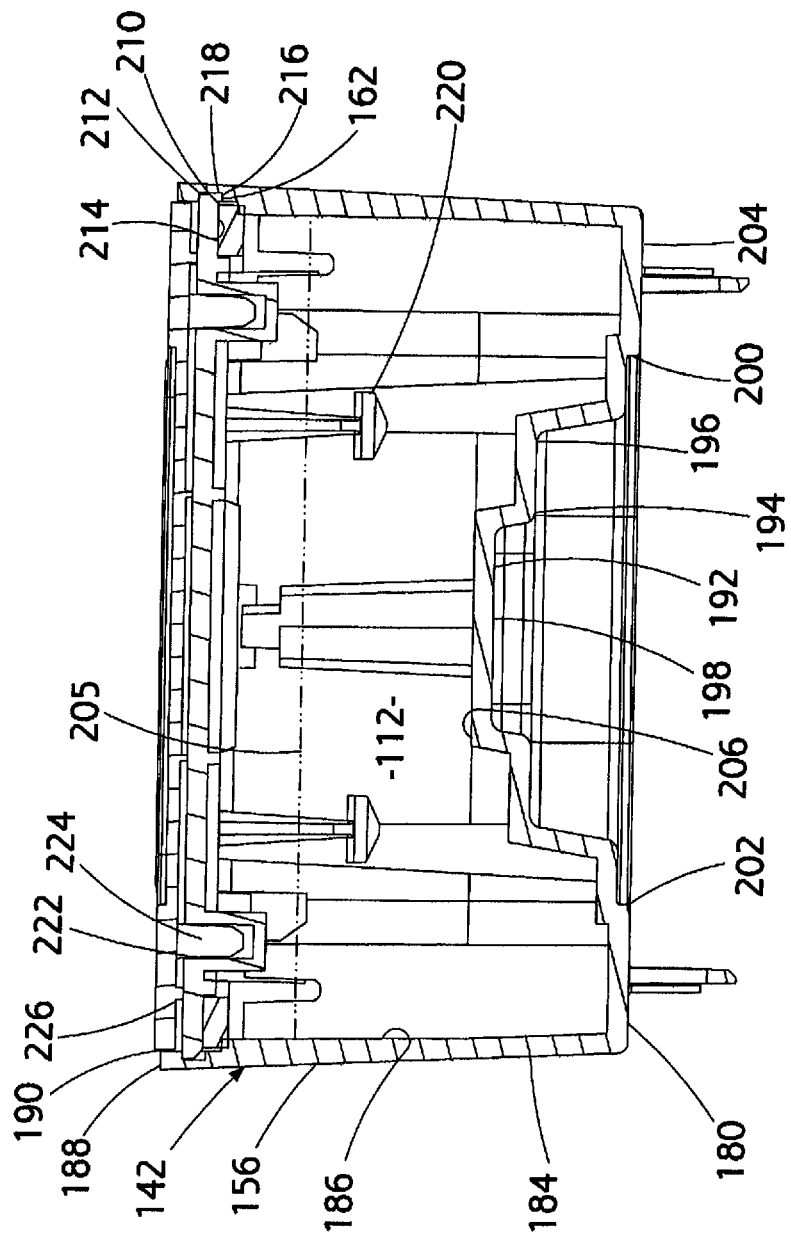
FIG. 9 is a cross sectional view of an enclosure lid taken along line 9-9 of the fire resistant enclosure shown in FIG. 6.
Figure 10:
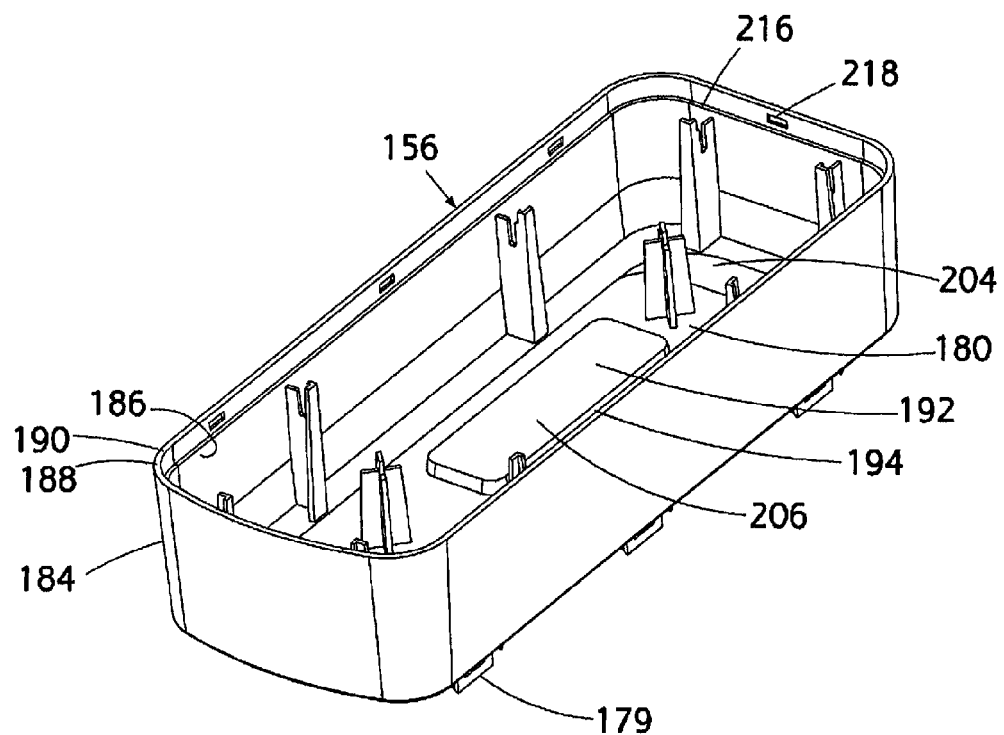
FIG. 10 is a top perspective view of a lid body shown in FIG. 9.

Referring now to FIGS. 6-8, a second aspect of the present invention is shown wherein a bucket-style fire resistant enclosure is generally shown as reference numeral 140. It will be understood that the second aspect of the present invention includes a bucket-style enclosure lid 142 and enclosure base 146, each being filled with thermally insulation fire-resistant material 112 such that insulation material 112 does not contact any seams or interfaces to eliminate leakage of insulation materials 112. Instead of encapsulating data storage device 76 within insulation material 112 as in the first aspect, the enclosure lid 142 and enclosure base 146 are used in conjunction with one another in the second aspect to enclose data storage device 76 within a storage compartment thereby allowing data storage device 76 to be removed from storage compartment.

Enclosure 140 generally includes bucket-style enclosure lid 142, an enclosure collar 144, status indicator 16, data transfer port 18, and bucket-style enclosure base 146. As best seen in FIG. 8 and described in further detail below, enclosure lid 142 may comprise an insert 148, a plate 150, a lid cap 152, a gasket 154, and a lid body 156. Enclosure collar 144 may comprise a status indicator flange 157 operable to mount status indicator 16, and a port clearance hole 160 operable to mount data transfer port 18 in enclosure collar 144. A base interface gasket 162 operates to seal an interface between enclosure lid 142 and enclosure base 146. An electrical cable assembly 164 may comprise a device connector 166, a device cable 168, data transfer port 18, a status indicator cable 170, and status indicator 16. Electrical cable assembly 164 operates to interconnect data storage device 76, data transfer port 18, and status indicator 16. Enclosure base 146 may comprise a base body 172, a gasket 174, and a base cap 176.

Figure 11:
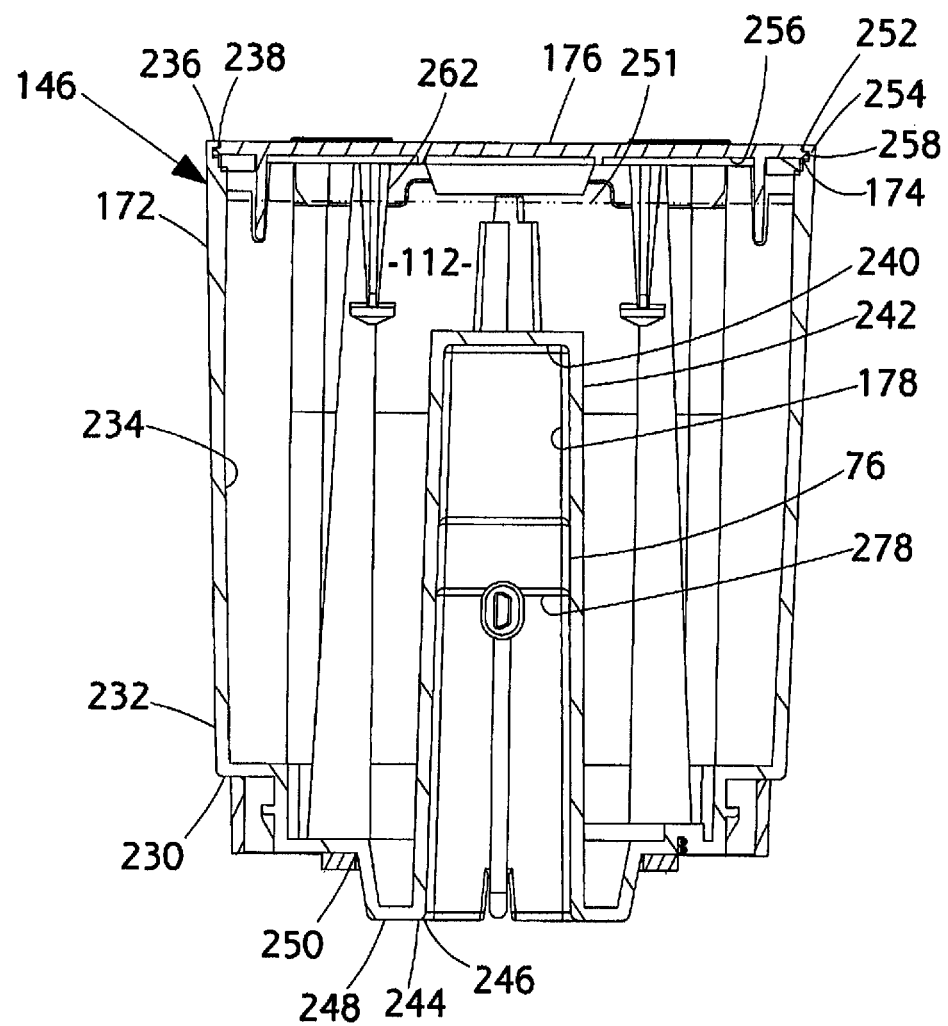
FIG. 11 is an inverted cross sectional view of an enclosure base taken along line 9-9 of the fire resistant enclosure shown in FIG. 6.

In operation, lid body 156 and base body 172 may be filled with fire resistant insulation material 112 and capped. Enclosure base 146 may be overturned and data storage device 76 may be inserted into an internal storage compartment 178-defined in base body 172 and connected to device connector 166 of cable assembly 164. In this aspect, as best seen in FIG. 11, data storage device 76 is not encapsulated or otherwise placed in intimate contact with insulation material 112 as in the first aspect. However, it will be understood that data storage device 76 may be placed in direct or indirect contact with the walls that define internal storage compartment 178, or in close proximity with the walls that define internal storage compartment 178, for example, between about 200 to 300 thousandths of an inch. The walls that define internal storage compartment 178 may be formed of a polymeric resin, for example, high density polyethylene (HDPE), that will act as a heat sink to allow heat generated by data storage device 76 to be adsorbed into the walls of internal storage compartment 178, into insulation material 112 and dissipated from enclosure 140. The amount of heat adsorbed by insulation material 112 is sufficient to allow data storage device 76 to operate within an acceptable operational temperature range such as, for example, between about 90-100° F. for a 2.5" hard disc drive and below about 140° F. for a 3.5" hard disc drive.

As best seen in FIG. 8, data transfer port 18 may be installed in port clearance hole 160 and device cable 168 may connect device connector 166 to data transfer port 18. Status indicator 16 may be mounted in an indicator clearance hole 158 defined in base body 172 and connected to data transfer port 18 by status indicator cable 170. Base interface gasket 162 may be installed upon base body 172 and enclosure collar 144 may be coupled with base interface gasket 162. A plurality of base interface connectors 179 disposed on a seamless bottom wall 180 of lid body 156 may extend downwardly through enclosure collar 144 to interlock with a plurality of lid interface anchors 182 disposed upon base body 172 to couple enclosure lid 142 with enclosure base 146 and enclose data storage device 76 in enclosure 140.

It should also be understood that data storage device 76 may have wireless capability to transfer data without the use of data transfer port 18. Thus, this aspect may be configured to eliminate portion of the data transfer port 18 that allows for the transfer of data and the portion of the cable that provides for the transfer of data. Unless data storage device operates on battery power, it should be understood that there still may need to be a port and power cable to provide power to data storage device 76.

Referring now to FIGS. 6-10, enclosure lid 142 comprises a lid body 156 including seamless bottom wall 180 having a seamless side wall 184 extending upwardly therefrom defining a lid body cavity 186 wherein side wall 184 includes an upper peripheral edge 188 that defines an opening 190 in lid body cavity 186. Bottom wall 180 may comprise a depression top wall 192 having a depression side wall 194 that may include a plurality of steps 196 extending outwardly and downwardly therefrom defining a lid depression 198 wherein depression side wall 192 may further include a lower peripheral edge 200 that defines an opening 202 in lid depression 198. Bottom wall 180 may further comprise a lid bucket-bottom wall 204 extending outwardly from depression side wall 194 to terminate at side wall 184 of lid body 156. Insulation material 112 may be positioned to a level 205 above a top surface 206 of depression top wall 192, for example about one inch, yet below upper peripheral edge 188 that defines opening 190 of lid body cavity 186, for example about ¼" of an inch so that insulation material 112 does not contact an interface formed between the lid cap 152 and lid body 156.

Lid cap 152 may include an outer peripheral edge 210 having a plurality of outwardly extending tabs 212 and a bottom surface 214. Lid cap 152 may be inserted into lid body cavity 186 until bottom surface 214 couples with lid cap gasket 154 disposed upon a peripheral shoulder 216 of side wall 184 of lid body 156. In this position, outwardly extending tabs 212 may interlock with a plurality of slots 218 defined in side wall 184 and a plurality of posts 220 may extend downwardly from bottom surface 214 and embed within insulation materials 112 further securing lid cap 152 within lid body. Lid cap 152 may further comprise a plurality of lid cap receptacles 222 operable to interlock with a plurality of plate connectors 224 extending downwardly from lid cap plate 150 and a plurality of lid cap insert connectors 226 extending downwardly from lid cap insert 148 to secure lid cap plate 150 and lid cap insert 148 to lid cap 152.

Figure 12:
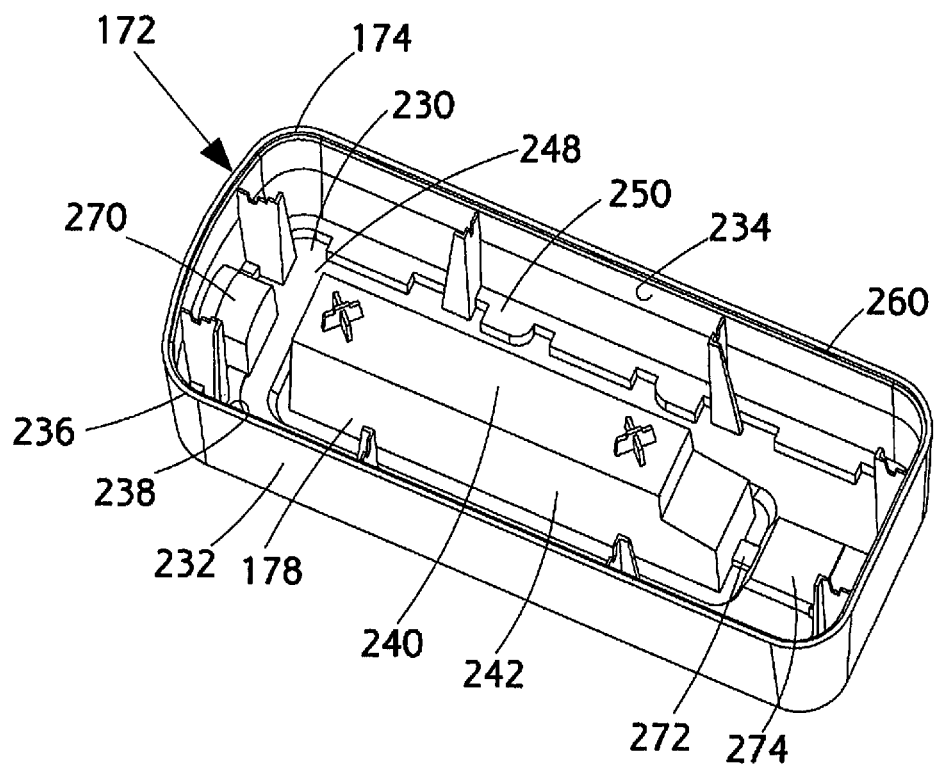
FIG. 12 is a top perspective view a base body of the inverted enclosure base shown in FIG. 11.

Enclosure base 146 and enclosure body 172 as shown in FIGS. 11 and 12 are shown in an upside down orientation because base body 172 is a bucket-style body that is filled and capped before overturning it to the orientation as shown in FIGS. 6-8. Referring now to FIGS. 6-8 and 11-13, base body 172 comprises a seamless bottom wall 230 having a seamless side wall 232 extending upwardly therefrom defining a base body cavity 234 wherein side wall 232 includes an upper peripheral edge 236 that defines an opening 238 in base body cavity 234. Bottom wall 230 may comprise a compartment top wall 240 having a compartment side wall 242 extending downwardly therefrom defining storage compartment 178 wherein compartment side wall 242 may further include a lower peripheral edge 244 defining an opening 246 in storage compartment 178. Bottom wall 230 may further comprise a base-bucket bottom wall 248 that may comprise a plurality of steps 250 extending outwardly and upwardly from compartment side wall 242 to terminate at side wall 232 of base body 172. Insulation material 112 may be positioned to a level 251 above compartment top wall 240, for example about one inch, yet below lower peripheral edge 244 that defines opening 246 of base body cavity 234, for example about ¼" of an inch so that insulation material 112 does not contact an interface formed between the base cap 176 and base body 172.

Base cap 176 may include an outer peripheral edge 252 having a plurality of outwardly extending tabs 254 and a bottom surface 256. Base cap 176 may be inserted into base body cavity 234 until bottom surface 256 couples with base cap gasket 174 disposed upon a peripheral shoulder 258 of side wall 232. In this position, outwardly extending tabs 254 may interlock with a plurality of slots 260 defined in side wall 232 and a plurality of posts 262 may extend downwardly from bottom surface 256 and embed within insulation material 112 further securing base cap 176 within base body 172. Base body 172 may be capped with base cap 176 and enclosure base 146 overturned to a position operable to mate with enclosure collar 144 and enclosure lid 142.

Figure 13:
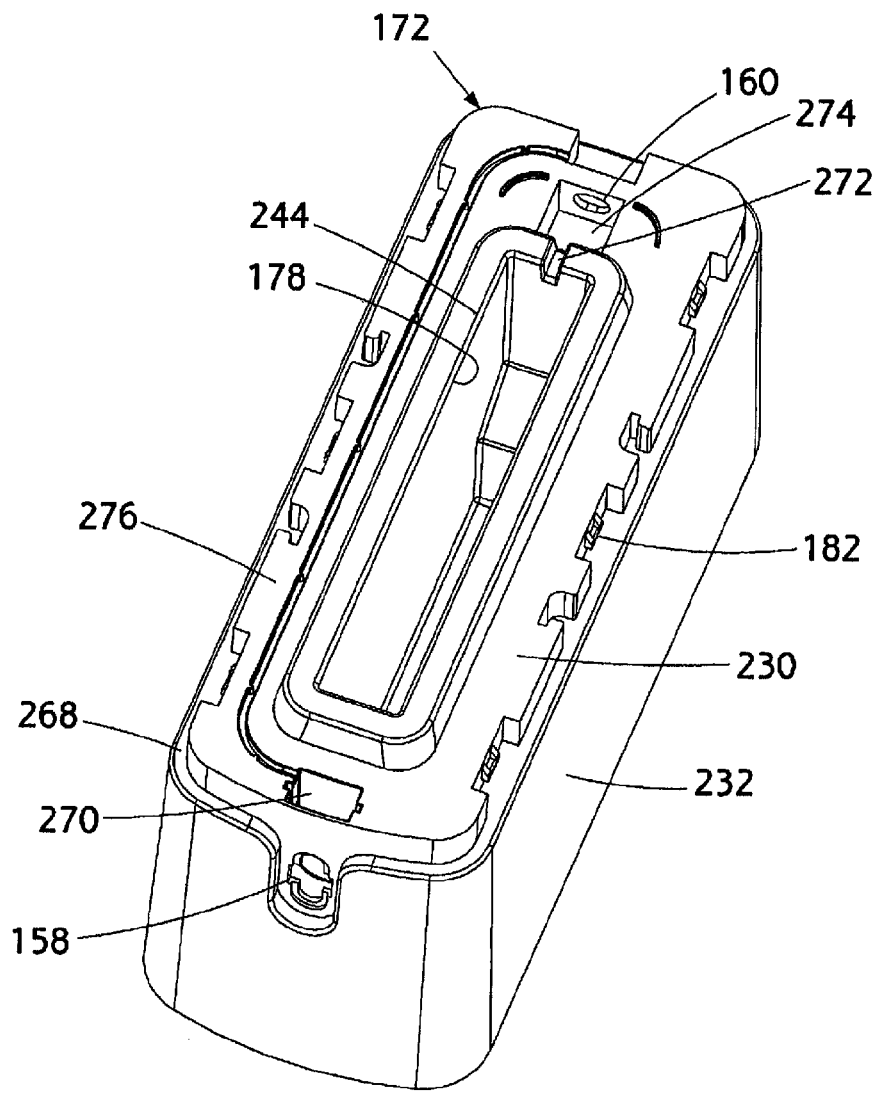
FIG. 13 is a top perspective view of the base body shown in FIG. 8.

As best seen in FIGS. 8 and 13, status indicator 16 and data transfer port 18 may be mounted in clearance holes 158,160. An indicator wiring channel 268, a status indicator trough 270, an electrical port notch 272, and an electrical port trough 274 may be defined in an external surface 276 of bottom wall 230 of base body 172. Device connector 166 of electrical cable assembly 164 may be connected to data storage device 76 that may include one or more peripheral spacing bands 278 wrapped around data storage device 76 that contact the walls of internal storage compartment 178 defined within base body 172, and securely position data storage device 76 within internal storage compartment 178. Status indicator 16 may be connected to data transfer port 18 by status indicator cable 170 routed through indicator wiring channel 268 and status indicator trough 270. Data storage device 76 may be connected to data transfer port 18 by device cable 168 routed through electrical port notch 272 and electrical port trough 274. Status indicator 16 may be secured in place by indicator flange 157 of enclosure collar 144 and a plate 284 that may be covered by an indicator cover 286. Plurality of base interface connectors 179 of enclosure lid 142 may extend through enclosure collar 144 to interlock with plurality of lid interface anchors 182 of enclosure base 146 to couple enclosure lid 142 with enclosure base 146 and data storage device 76 in the fire resistant enclosure 140.

Figure 14:
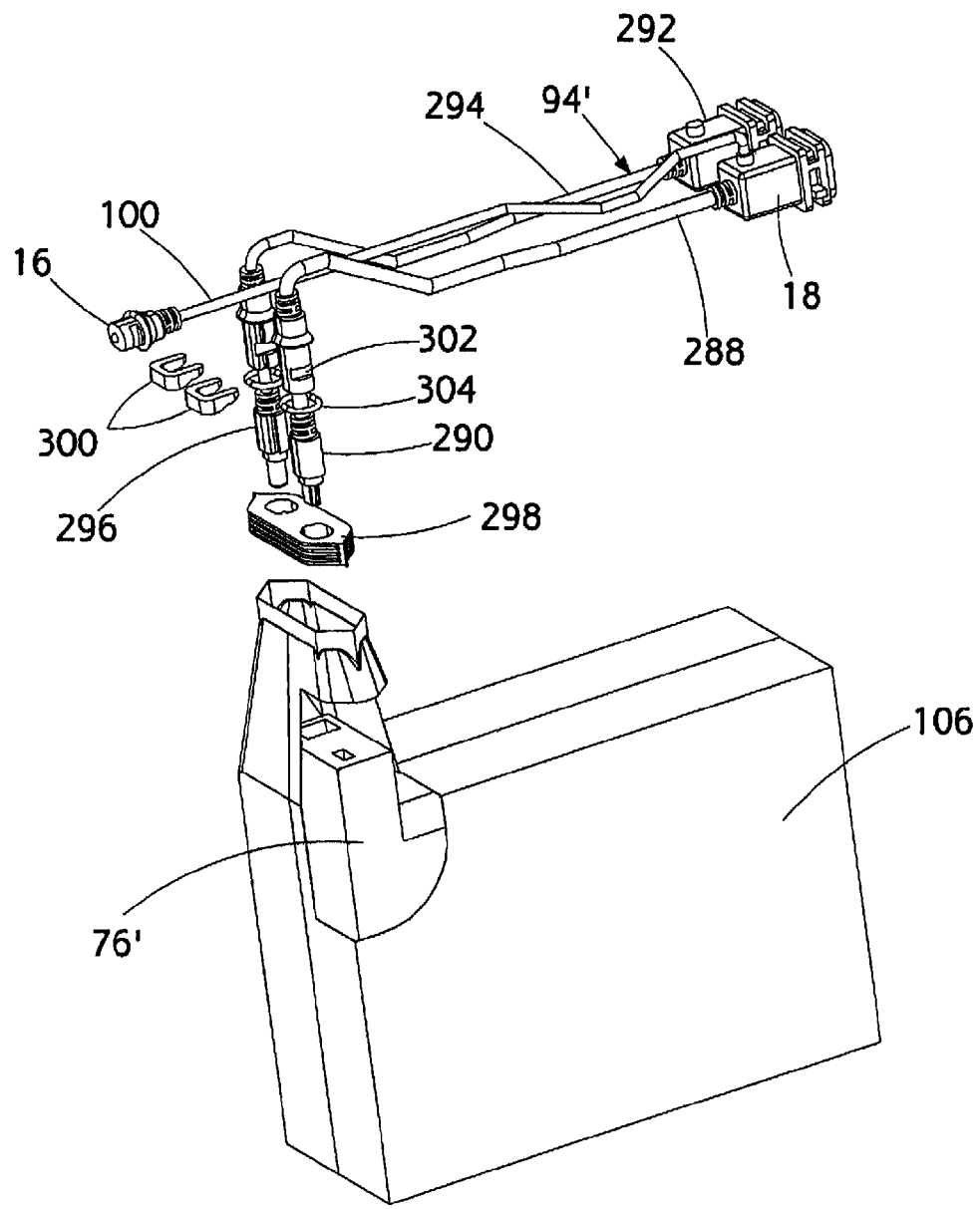
FIG. 14 is an exploded perspective view of a data storage device enclosed within a bag, wherein a portion of the bag is broken away.

While the above-mentioned aspects of the present invention have been described with reference to a data storage device 76 shown in FIGS. 3-5 and 11, which is shown as a 2.5" hard disc drive, it should be understood that this data storage device may also be a 3.5" hard disc drive which is identified as reference numeral 76' in FIG. 14. As best seen in FIG. 14, the data storage device 76' may be encased in barrier 106, such as a bag formed of a multi-layer (e.g., 2 layers) coextruded film that is about 5 millimeters thick, such as a FS 5050 film manufactured by Cryovac Sealed Air Corporation, Duncan, S.C. Data storage device 76' may be connected to an electrical cable assembly 94', which may comprise data transfer port 18, a data transfer cable 288, and a data transfer connector 290. The data transfer connector 290 may plug into data storage device 76' so that data transfer cable 288 may transmit data and/or communication signals between data storage device 76' and data transfer port 18. Data transfer port 18 may be, for example, a USB connection port. Electrical cable assembly 94' may also include a DC power port 292, a DC power cable 294, and a DC power connector 296 to plug into data storage device 76' so that DC power cable 294 may provide power to data storage device 76' through DC power port 292. Electrical cable assembly 94' may further comprise status indicator 16, such as an LED, and a status indicator cable 100 to conduct signals indicating conditions such as, but not limited to, power status of data storage device 76' to status indicator 16.

As best seen in FIG. 14, data storage device 76' may be placed within barrier 106, such as a bag, and the DC power cable 294 and data transfer cable 288 are fed through a seal fitment 298. DC power connector 296 and data transfer connector 290 are then plugged into data storage device 76' and seal fitment 298 is sealably bonded or otherwise fitted with the barrier 106 so that moisture or fire-resistant insulation does not pass into barrier 106 when the data storage device 76' is encapsulated in the enclosure. Further, a pair of retaining clips 300 are used to engage undercuts 302 formed in data transfer connector 290 and DC power connector 296 and provide compression on O-rings 304, which forms a seal between electrical cable assembly 94' and seal fitment 298. It will be understood that the advantages discussed above with respect to the data storage device 76 also generally apply to the data storage device 76'.

While the invention has been described by reference to various specific aspects, it should be understood that numerous changes may be made within the spirit and scope of the inventive concepts described. Accordingly, it is intended that the invention not be limited to the described aspects, but will have full scope defined by the language of the following claims.

What is claimed is:

1. A method of protecting a data storage device within a fire resistant enclosure, said method comprising the steps of:
    providing a base body including a bottom wall with a side wall extending upwardly therefrom defining a cavity;
    encasing said data storage device in a moisture barrier;
    after encasing said data storage device in said moisture barrier, inserting said data storage device within said cavity;
    positioning a fire resistant insulation material within said cavity so that said fire resistant insulation material is in direct intimate contact with a substantial portion of said moisture barrier;
    providing a base cap; and
    coupling said base cap with said base body to enclose said data storage device within the fire resistant enclosure, wherein said fire resistant insulation material is a heat sink for said data storage device.

2. The method in accordance with claim 1 wherein said moisture barrier is a bag.

\* \* \* \* \*